United States Patent [19]

Miyake et al.

[11] Patent Number: 4,689,700
[45] Date of Patent: Aug. 25, 1987

[54] TRACKING APPARATUS FOR ROTARY RECORDING MEDIUM ON THE BASIS OF ENVELOPE DETECTION

[75] Inventors: Izumi Miyake; Kiyotaka Kaneko; Katsuo Nakadai; Kazuya Oda, all of Kaisei, Japan

[73] Assignee: Fuji Photo Film Co., Ltd., Kanagawa, Japan

[21] Appl. No.: 845,338

[22] Filed: Mar. 28, 1986

[30] Foreign Application Priority Data

Apr. 8, 1985 [JP] Japan ................................. 60-72528
Apr. 8, 1985 [JP] Japan ................................. 60-72529

[51] Int. Cl.$^4$ .............................................. G11B 5/56
[52] U.S. Cl. .................................................... 360/77
[58] Field of Search ...................... 360/77, 78; 369/43, 369/44

[56] References Cited

U.S. PATENT DOCUMENTS

| | | | |
|---|---|---|---|
| 3,956,766 | 5/1976 | Hanson et al. | 360/78 |
| 4,485,418 | 11/1984 | Bremmer | 360/77 |
| 4,544,969 | 10/1985 | Painton | 360/78 |
| 4,563,713 | 1/1986 | Cahoon et al. | 360/78 |

*Primary Examiner*—George G. Stellar
*Attorney, Agent, or Firm*—Birch, Stewart, Kolasch & Birch

[57] ABSTRACT

A tracking apparatus for tracking a track recorded in a rotary recording medium which rotates at a predetermined constant speed has a playback head for sensing a signal out of a desired one of tracks each being provided in the recording medium such that a beginning and an end of recording coincide with each other includes a head transport mechanism for supporting the playback head movably along the recording medium, an envelope detector for detecting an envelope of the signal sensed by the playback head, and a controller for controlling the head transport mechanism to move the playback head to a position where a desired one of the tracks is located. The head transport mechanism includes a head position detector for detecting a position of the playback head on the recording medium. The controller is constructed to control the head transport mechanism to move the head to compute for one of the tracks two different positions where a level of the envelope detected by the envelope detector has a reference value, then compute an intermediate position between the two positions, and then control the head transport mechanism to move the head to the intermediate position. The reference value may be controlled higher when the position of the head is associated with any of the tracks having comparatively large diameters than when it is associated with any of the tracks having comparatively small diameters.

9 Claims, 17 Drawing Figures

 FIG.2A ENVELOPE
 FIG.2B TRACK POSITION PULSE
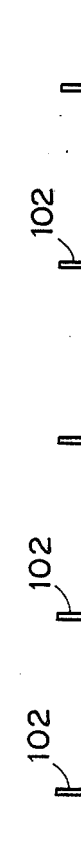 FIG.2C TRACK PULSE
HEAD POSITION

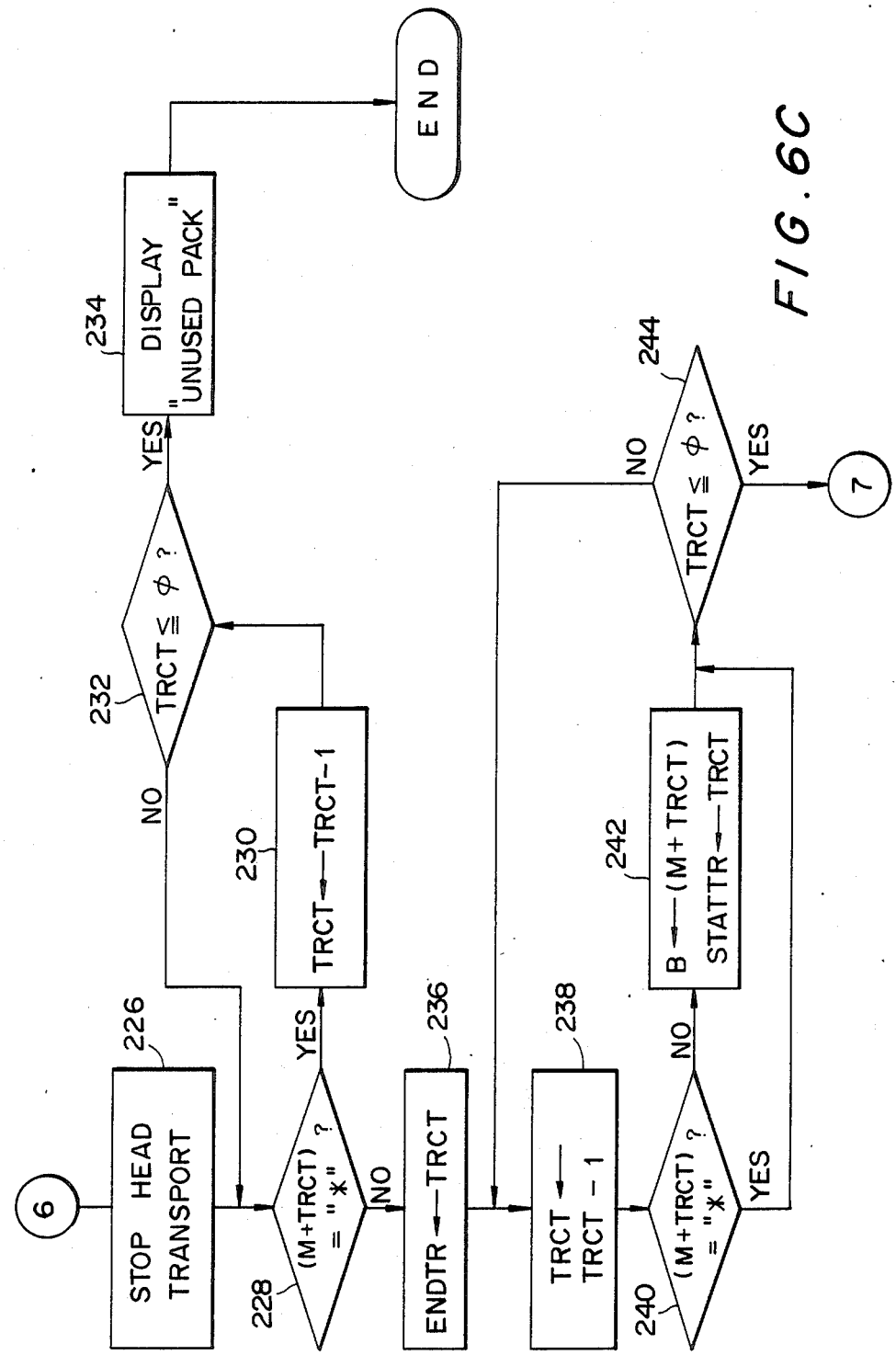

TRACKING APPARATUS FOR ROTARY RECORDING MEDIUM ON THE BASIS OF ENVELOPE DETECTION

BACKGROUND OF THE INVENTION

1. Field of the Invention

The present invention relates to an apparatus for playing back a rotary recording medium and, more particularly, to a tracking apparatus for the playback apparatus which reproduces video signals or other information signals out of a rotary magnetic recording medium such as a magnetic disk.

2. Description of the Prior Art

One of the major achievements in the imaging art is an electronic still camera system which uses an image pickup device, typically a solid-state imaging device or an imaging tube, and a recording apparatus of the type using a magnetic disk which is a relatively inexpensive and large-capacity recording medium. Specifically, the system is such that a desired image is purely electronically construed the form of electrical signals representative of a still picture to be recorded in a rotary magnetic disk, while the picture is reproduced by means of a television system, a printer, or the like.

A rotary magnetic recording medium applicable to such an electronic still camera system and others may comprise a disk which has a diameter as small as about 50 millimeters and allows fifty tracks to be recorded therein at pitches of about 100 microns, that is, with a track width of about 50 to 60 microns and a guard band width of about 50 to 40 microns. In a recording apparatus or a playback apparatus, the disk is rotated at a constant speed e.g., 3,600 revolutions per minute so that a video signal is recorded or reproduced on a field or a frame basis.

The problem with a recording medium adapted for such magnetic recording, particularly a magnetic disk, is that tracking errors are apt to occur due to compatibility with an apparatus, eccentricity, thermal expansion and others which are inherent in the recording medium. Tracking errors may cause a magnetic playback head to scan a track other than and adjacent to a desired one, resulting in crosstalk.

An approach heretofore proposed to solve the tracking error problem is a system in which, while a recording magnetic head records a tracking signal in a recording medium under application of a tracking servo, a playback head effects tracking servo utilizing the recorded tracking signal. It is impractical, however, to install a tracking servo mechanism which inherently requires accurate control in a camera or similar small-size and light-weight recording apparatus.

In light of the above, a guard band system or a frequency modulation (FM) azimuth system may be used for a recording scheme. The guard band or FM azimuth recording scheme is successful in preventing a playback head from scanning a track adjacent to a desired one or, if scanned, from picking up a signal prerecorded in the adjacent track, thereby compensating for some degrees of tracking error during reproduction.

Another known approach is a so-called envelope peak detecting autotracking control system. The principle of this system is such that during recording a record head is transported by a stepping motor at predetermined track pitches without effecting tracking servo and, during playback, a playback head detects an envelope of signals read out of each track so as to identify an optimum track based on the peak of the envelope, thereby effecting tracking servo.

In the envelope peak detecting autotracking system, a particular head position where the positive peak of envelope levels detected is determined by transporting a magnetic head a predetermined pitch to a first position to detect an envelope level there, then transporting it another predetermined pitch to a second position to detect an envelope level again, and then comparing the envelope level detected at the second position with that detected at the first position.

The comparison mentioned above may advantageously be implemented with a digital processing system, as has generally been done. For this end, a video signal read out of a track by a playback head is applied to an envelope detector and, then, envelope levels produced by the envelope detector are converted by an analog-to-digital converter to digital values to be applied to a digital processing system. Advantageously, only those envelope levels which are higher than a predetermined threshold should be compared so that detection errors due to noise and other disturbances within the system may be eliminated.

However, the envelope peak detecting autotracking control system has the drawback that since the head must be moved in opposite directions to track each track by detecting the peak of envelope levels, the response of the system is relatively slow.

Meanwhile, in a magnetic disk type rotary recording medium which is rotated at a predetermined constant speed, the linear velocity of a track relative to a head sequentially decreases from the radially outermost track toward the radially innermost track. Hence, the envelope levels of frequency signals which are sensed by the head and detected sequentially decrease from the radially outermost track toward the innermost one. Assuming that frequency signals prerecorded in the tracks of a recording medium lie in the same frequency band, the envelope level is generally dependent upon the condition of contact of the head with a track and upon the linear velocity of a track relative to the head and, therefore, the radius of a track, the latter being far more dominant than the former. Macroscopically, therefore, the envelope output level drops substantially in proportion to the radius of a track. In such a situation, there is an increasing demand for a tracking device which is capable of accurately and rapidly tracking tracks despite the dependence of the envelope level upon the head position.

SUMMARY OF THE INVENTION

It is therefore an object of the present invention to eliminate the drawbacks inherent in the prior art device and provide a tracking apparatus which tracks a rotary recording medium at a high speed.

It is another object of the present invention to provide a tracking apparatus which tracks a rotary recording medium accurately and, yet, rapidly without regard to the position of a head.

In accordance with the present invention, in a tracking apparatus for tracking a track recorded in a rotary recording medium which rotates at a predetermined constant speed, having a playback head for sensing a signal out of a desired one of a plurality of tracks each being provided in the recording medium such that a beginning and an end of recording coincide with each other, a head transport mechanism for supporting the playback head movably along the recording medium, an envelope detector for detecting an envelope of the signal which is sensed by the playback head, and a controller for controlling the head transport mechanism to move the playback head to a position where a desired one of the tracks is located. The head transport mechanism comprises a head position detector for detecting a position of the playback head on the recording medium. The controller is constructed to control the head transport mechanism to move the playback head to compute for one of the tracks two different positions at each of which a level of the envelope detected by the envelope detector has a value substantially equal to a reference value, then compute an intermediate position between the two positions, and then control the head transport mechanism to move the playback head to the intermediate position.

In a preferred embodiment of the present invention, the controller is further constructed to make the reference value variable responsive to a position of the head which is detected by the head position detector, and control the reference value higher when the position of the head is associated with any of the tracks having comparatively large radii than when the position of the head is associated with any of the tracks having relatively small radii.

BRIEF DESCRIPTION OF THE DRAWINGS

The objects and features of the present invention will become more apparent from a consideration of the following detailed description taken in conjunction with the accompanying drawings in which:

FIGS. 2A-2C show waveforms representative of pulses which are associated with positions of a magnetic head included in the apparatus of FIG. 1;

FIGS. 5A to 5E and 6A to 6F are flowcharts showing specific examples of tracking operations which are effected by a controller also included in the apparatus of FIG. 1.

DESCRIPTION OF THE PREFERRED EMBODIMENT

In the following description, the terms "a plurality of tracks each being formed such that the beginning and the end of a recording coincide with each other" should be understood to imply tracks which are formed one after another without changing the position of a recording head relative to a rotary magnetic recording medium. Such tracks may be represented by tracks which are provided on a magnetic disk concentrically around an axis of rotation of the disk, or parallel tracks provided on a magnetic drum at spaced locations along the axis of the drum.

Figure 1:
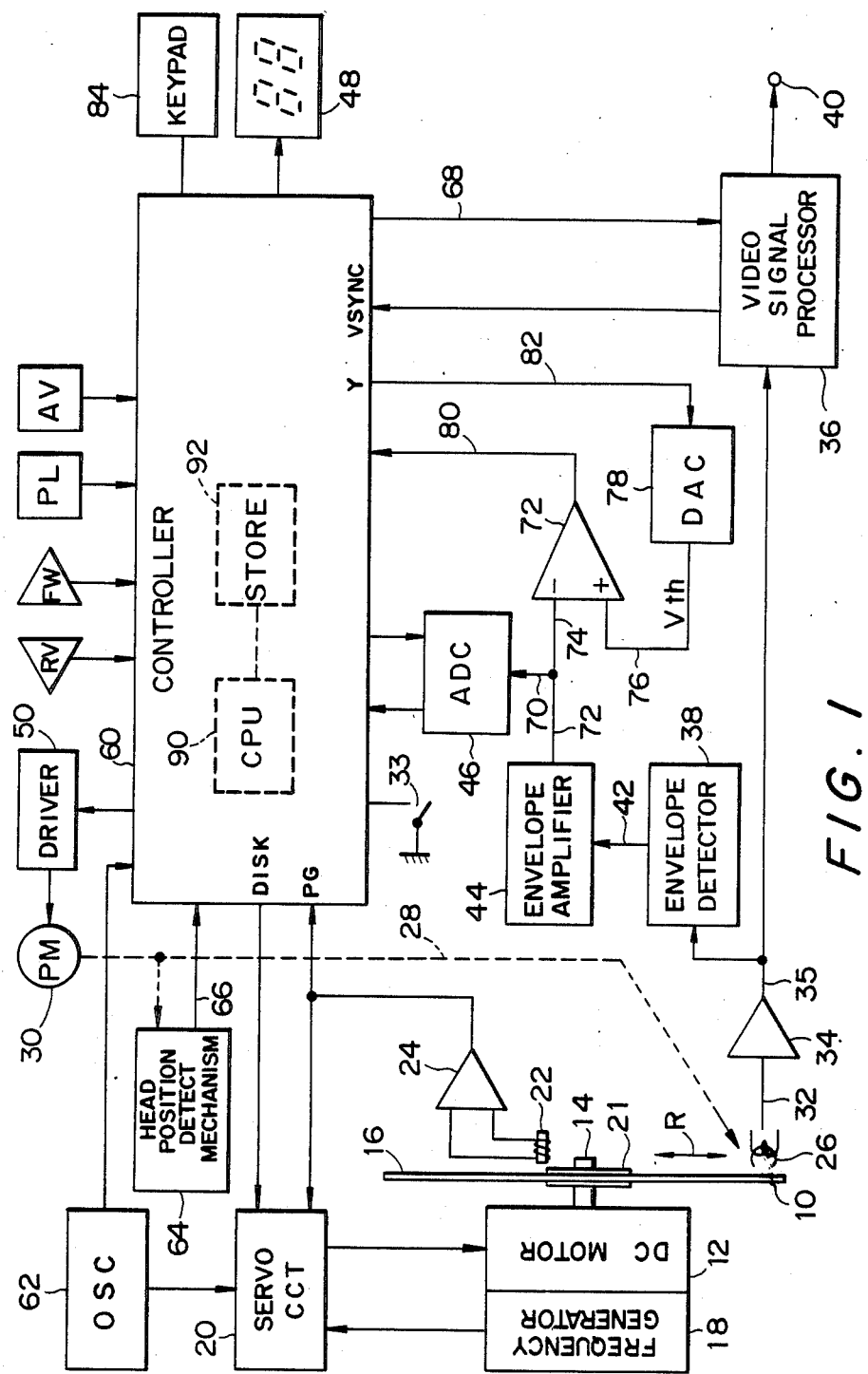
FIG. 1 is a schematic block diagram of a rotary recording medium tracking apparatus embodying the present invention.

Referring to FIG. 1 of the drawings, a tracking apparatus in accordance with the present invention is shown in a schematic block diagram. A magnetic disk or like rotary recording medium 10 is detachably mounted on a spindle 14 which in turn is driven by a DC motor 12. In this particular embodiment, the magnetic disk 10 comprises a sheet made of a magnetic recording material and dimensioned substantially 50 millimeters in diameter. Provided on a surface 16 of the magnetic disk 10 are a plurality of tracks, such as fifty tracks, which are arranged concentrically at pitches of substantially 100 microns by way of example. In the illustrative embodiment, the signals stored in the tracks on the disk 10 are video signals which may typically be represented by color video signals produced by frequency-modulating luminance signals and chroma signals. For example, field video signals produced by raster scanning and each completing one field are recorded one in each track.

The DC motor 12 is provided with a frequency generator 18 the output of which is coupled to a servo circuit 20. The servo circuit 20 supplies power to the DC motor 12 and servo-controls it such that the disk 10 rotates at a predetermined constant speed, e.g., 3,600 revolutions per minute. Specifically, a controller 60 adapted to supervise the operation of the whole device applies a control signal DISK to the servo circuit 20 which then controls the DC motor 12 and, thereby, the rotation of the disk 10.

A phase generator 22 is located in a predetermined position adjacent to the prerecorded surface 16 of the disk 10 and interconnected to the servo circuit 20 and the controller 60 via an amplifier 24. The disk 10 includes a core 21 which is provided with a timing mark at a predetermined position thereof. The phase generator 22 generates a timing pulse PG every time it senses the timing mark on the core 21.

Disposed above the prerecorded surface 16 of the disk 10 is a magnetic transducer or magnetic head 26 which is supported by a support mechanism 28. As schematically represented by a dotted line 28 in the figure, the support mechanism 28 is selectively driven by a stepping motor (PM) 30 to move the head 26 in both directions radially along the surface 16 of the disk 10, as indicated by a double-headed arrow R. This allows the head 26 to select a desired one of the tracks formed on the disk surface 16.

A head position detection mechanism 64 is associated with the support mechanism 28. Appearing at an output terminal 66 of the mechanism 64 are signals which are associated with a position of the head 26 on the disk surface 16. In this particular embodiment, those signals comprise a signal representative of variations associated with step-by-step transport of the head 26 which is effected by the stepping motor 30 as will be described, track position pulses 100 (see FIG. 2B) appearing at those head positions which substantially correspond to the positions where envelopes of signals sensed by the head 26 out of tracks, which were recorded substantially in an ideal condition in the disk 10, show their peaks, and track pulses 102 (see FIG. 2C) appearing at those head positions which are deviated 180 degrees from the track position pulses 100 in terms of spatial phase.

While the head 26 may be of the kind having a magnetic recording function, it in the illustrative embodiment is assumed to have a playback function, i.e., a function of sensing video signals prerecorded in the disk surface 16 and converting them to electrical signals. In the illustrative embodiment, the disk 10 is rotated at a substantially constant speed of 3,600 revolutions per minute as previously stated. Hence, one track of video signal, or one field of FM video signal, is reproduced by the head 26 for each rotation of the disk 10, or 1/60 second. When demodulated, the FM video signal is compatible with a standard color television system such as the national television systems committee (NTSC) system.

The output 32 of the playback head 26 is applied to a video signal processor 36 and an envelope detector 38 via a preamplifier 34. The video signal processor 36 processes a video signal sensed by the head 26 so as to produce a composite color video signal in, for example, the NTSC format. The output of the video signal processor 36 is applied to an output terminal 40 of the tracking device. Also, the video signal processor 36 extracts vertical sync signals VSYNC from the NTSC format composite color video signals to deliver them to the controller 60. The controller 60, on the other hand, delivers a control signal 68 to the processor 36 to control the video signal output. It should be noted that the function of converting the signal format to a standard one which is assigned to the processor 36 does not constitute any essential part of the present invention and may be replaced with a function of separating sync signals from video signals which are sensed by the head 26 and a function of simply delivering the separated sync signals to the output terminal 40 under the control of the controller 60.

The envelope detector 38 serves to detect the envelope of any of the FM video signals stored in the tracks on the disk surface 16. An output voltage of the envelope detector 38 which is representative of the detected envelope is applied over a line 42 to an envelope amplifier 44. The output 72 of the envelope amplifier 44 in turn is delivered to an input terminal 70 of an analog-to-digital converter (ADC) 46 and to an inverting input terminal 74 of a comparator 72.

Interconnected to a non-inverting input terminal 76 of the comparator 72 is an output terminal of a digital-to-analog converter (DAC) 78. An output terminal 80 of the comparator 72 is interconnected to the controller 60. The comparator 72 compares the voltages appearing at its inputs terminals 74 and 76 and, when the former has exceeded the latter, produces a signal representative of the difference at the output terminal 80.

The controller 60 applies a control signal Y to an input terminal of the DAC 78 over a line 82. Responsive to the signal Y, the DAC 78 delivers to the non-inverting input 76 of the comparator 72 a voltage which is associated with the control signal Y, as a threshold signal Vth for comparison.

The ADC 46 has 256 quantizing levels and functions to convert the envelope level signal fed to its input 74 into eight-bit data. The eight-bit data is supplied from the ADC 46 to the controller 60 when requested by the latter.

As will be described later, the controller 60 totally governs the various parts and elements of the tracking device responsive to operator's manipulations. The controller 60 may advantageously be implemented by a microprocessor system which includes a central processing unit (CPU) 90 and a store 92. In this particular embodiment, a playback key PL, a track select (random access) key AV, a forward key FW and a reverse key RV are interconnected to the controller 60 for the manipulations. The key PL is adapted to start and stop the operation of the tracking device, the key AV to move the magnetic head 26 to a desired track position which may be set beforehand, the key FW to transport the head 26 forwardly with respect to the order of track numbers (e.g. from a radially outer track to a radially inner one), and the key RV to transport the head 26 in the other direction.

Also connected to the controller 60 are a keypad 84 which includes ten keys for entering a track number to be selected. In the illustrative embodiment, the entered track number appears in a display 48 which may comprise light-emitting diodes or a CRT display, for example. If desired, the controller 60 may also be furnished with a function of producing audible signals for alerting purpose, for example.

In this particular embodiment, the stepping motor 30 comprises a four-phase drive stepping motor which rotates about 15 degrees responsive to one drive pulse and, therefore, 360 degrees responsive to twenty-four drive pulses in total. The head support mechanism 28 is so constructed as to move the head 26 substantially 4.2 microns in the direction of arrow R every time the motor 30 rotates 15 degrees responsive to one pulse as mentioned, that is, substatially 100 microns every time the motor 30 completes one full rotation responsive to twenty-four pulses.

A motor driver 50 which comprises a current amplifier is interconnected to the stepping motor 30 for supplying the latter with the drive pulses. Specifically, the motor driver 50 generates pulses for driving an exciting coil of the motor 30 as specified by a drive pattern, which the controller 60 prepares. While positions of the head 26 over the disk surface 16 are detected by the head position detection mechanism 64 as shown and described, they may alternatively be identified in terms of the number of output pulses of the stepping motor 30 which may be counted by the controller 60.

An oscillator (OSC) 62 oscillates to develop two different kinds of reference clocks which respectively are applied to the servo circuit 20 and the controller 60. In this particular embodiment, the reference clock applied to the servo circuit 20 has the same frequency, 60 hertz, as the field frequency of video signals which are stored in the disk 10, while the reference clock applied to the controller 60 has a higher frequency, e.g. 3.58 megahertz.

In this particular embodiment, the tracking device does not rely on the previously discussed envelope peak detecting autotracking control to cause the magnetic head 26 to track the disk 10 and, instead, uses a unique tracking principle as will be described.

Figure 3:
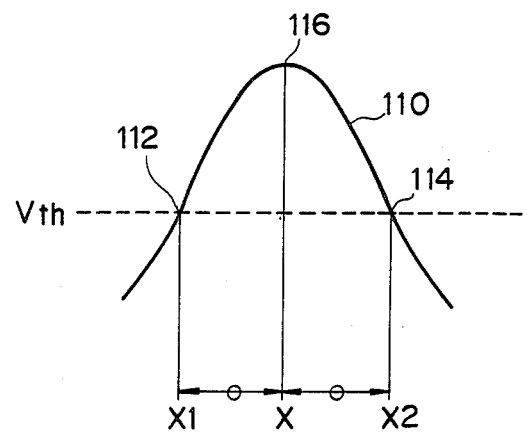
FIGS. 3 and 4 show waveforms useful for understanding the principle of the present invention in relation to the apparatus of FIG. 1.

As shown in FIG. 3, assume that the envelope detector 38 has detected an envelope 110 of a video signal which is stored in a certain track of the disk 10. Then, head positions X1 and X2 associated respectively with two points 112 and 114 where the envelope 110 crosses a predetermined reference value, i.e., the threshold value Vth are determined. In this particular embodiment, the head positions X1 and X2 are determined in terms of a distance from a predetermined home position (HP) for the head 26. Usually, it is advantageous that the home position be located outwardly of the radially outermost one of the tracks on the disk 10. A return of the head 26 to the home position is sensed by a switch 33.

In this particular embodiment, a simple mean position of the head positions X1 and X2 provided in terms of a distance from the home position as stated above, i.e., an intermediate position X $(=(X1+X2)/2)$ is regarded as the center of the track in the radial direction of the disk 10, the head 26 being moved to the intermediate position X. In this situation, so long as a signal is stored in the disk 10 with its envelope 110 ideally conditioned, the peak 116 of the envelope 110 is expected to substantially align with the intermediate position X. This stems from the fact that an envelope in an ideal condition has a right and a left portions which are substantially symmetrical to each other.

Figure 4:
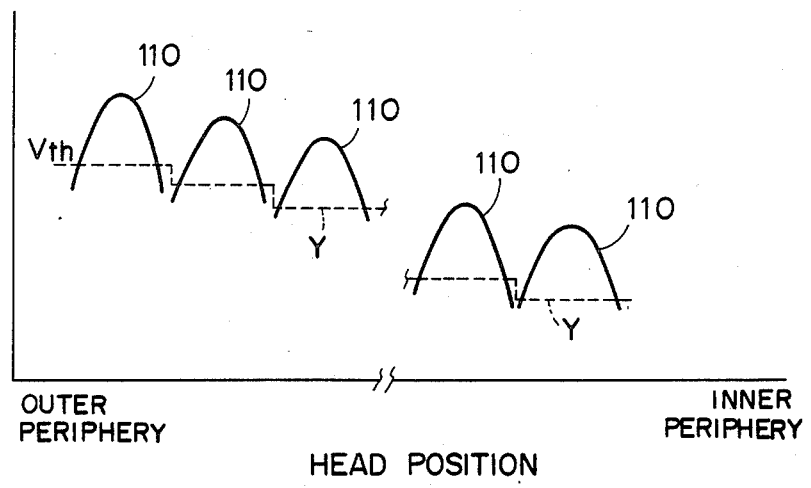

In this particular embodiment, the threshold level Vth for determining the head positions X1 and X2 where the envelope 110 crosses the threshold level Vth is varied depending upon the position of a track where the head 26 is located. Stated another way, it is variable with the track number. Specifically, as shown in FIG. 4, the threshold level Vth is controlled to sequentially lower from a head position closest to the outer periphery of the disk 10 toward a position closest to the inner periphery of the same.

In the illustrative embodiment, the threshold levels Vth are each advantageously selected to be substantially one half the peak of the associated envelope. Then, in this particular embodiment, a data signal Y representative of a threshold level Vth which is to be assigned to the comparator 72 for any desired track number N is expressed as:

$$Y = (A \cdot N + B)/2 \qquad \text{Eq. (1)}$$

where A is a variation ratio of the threshold level, i.e., an amount relating to a gradient (negative in this particular example), and B is an envelope value associated with the first track, i.e., an amount relating to an intercept.

In more detail, while the magnetic disk 16 rotates at a predetermined constant rate, the linear velocity of a track relative to the head sequentially decreases from the radially outermost track toward the radially innermost track and so do the envelope levels of a frequency signal stored in a track. Generally, assuming that the frequency signals stored in the tracks of a magnetic disk lie in the same frequency band, the envelope levels depend upon the condition of contact of a head with a track and the linear velocity of a track relative to the head and, therefore, the radius of a track, the latter being far more dominant than the former. Macroscopically, therefore, the envelope output level decreases substantially in proportion to the track radius.

In light of the above, where the apparatus is constructed such that the threshold level Vth assumes a certain fixed value with no regard to the head position, it is preferable to select a relatively low threshold level Vth inasmuch as the buildup of an envelope 110 can be clearly sensed even in the radially innermost track. However, this gives rise to a problem that, when it comes to the radially outermost track, foot or skirt portions of an envelope are undesirably compared with the threshold level so that the accuracy of discrimination is apt to become very poor due to the influence of noise and other possible disturbances. In this particular embodiment, such an occurrence is eliminated by rendering the threshold value Vth variable from one head position to another.

Referring to FIGS. 5A-5E, there is shown an example of operations which the controller 60 may perform random access of the magnetic head 26 to a desired track on the magnetic disk 10. The operation begins with a system initializing step 200 in which a track counter (TRCT) is reset to "0" and then loaded with the first address M of data buffer areas, which are adapted to store envelope data and, naturally, provided in the store 92. Then, whether the head 26 is located in the home position (HP) is sensed by the switch 33 (202) and, if not, the head 26 is transported backwardly to the home position (204).

After the switch 33 has sensed the head 26 in the home position, a magnetic disk pack having the magnetic disk 20 therein is loaded in the device of the present invention. Then, the spindle 14 chucks the core 21 with the result that a pack loading end switch and a pack switch, not shown, are actuated (206, 208). In this condition, the controller 60 causes the head 26 to be transported forwardly at a constant rate (210) and, every time it senses a track position pulse 100 which is applied from the head position detection mechanism 64 to the input 66 (212), reads an envelope at that particular position via the ADC 46 (214).

When an envelope has been sensed (216), the controller 60 writes the envelope value in a particular position of the data buffer which is designated by an address (M+TRCT) as indicated by the track counter TRCT at that time (220). In the flowcharts, a parenthesis is representative of data stored in a particular position which is indicated by the parenthesized address. If no envelope is detected, the controller 60 writes a particular value such as "*" in the designated position (218).

Until the track counter TRCT reaches a predetermined limit count (222), e.g., "55" if the maximum number of tracks which the disk 10 accommodates is fifty, the controller 60 causes the head 26 to be continuously transported. In the meantime, the controller 60 sequentially increments the counter TRCT (224) to read envelopes associated with the consecutive tracks and writes their values in data buffer areas which are assigned to the tracks.

As the track counter TRCT reaches the limit count, the controller 60 interrupts the transport of the head 26 (226) and then decrements the track counter TRCT (228) down to a particular track position where the data "*" stored in the data buffer is replaced with another (230, 232 and 228). If an envelope has not been sensed in all the tracks on the disk 10, the controller 60 shows that the loaded disk pack is a fresh or unused one on the display 48.

As track position envelope data which has been stored in the buffer is found while the counter TRCT is decremented, the controller 60 memorizes it as a final or end track position ENDTR (236). When the counter TRCT is further decremented (238) to reach another track position envelope data of which has also been stored in the data buffer (240), the controller 60 memorizes it as a first or start track position STATTR and stores in an area B the data stored in the particular position of the data buffer which is associated with that track, i.e. envelope value (242). Such a procedure is repeated until the counter TRCT reaches "0". When the counter TRCT has decremented to "0", therefore, the true first track position has been stored in the area STATTR and the envelope value of the first track in the area B.

The controller processes the data ENDTR, STATTR, (M+STATTR) and (M+ENDTR) to calculate a ratio (gradient) A with which the threshold value Vth is to be varied for each head position (246).

In the above condition, the controller 60 returns the head 26 to the home position (248, 250). As the track select key AV is depressed (252), the controller 60 computes data Y using the previously stated Eq. (1) and a number N assigned to a desired or target track, which is entered through the keypad 84. The resulting data Y is applied to the DAC 78 (254).

Then, the controller 60 causes the head 26 to be moved in the forward direction (256) while counting track pulses 102 (258). As the controller 60 sees the arrival of the head 26 at the target track responsive to the track pulses (260), it monitors the output 80 of the comparator 72 to determine a time at which the output 80 undergoes a reversal (262). Upon the reversal of the comparator output 80, the controller 60 determines a position of the head 26 of that instant based on the output 66 of the head position detection mechanism 64 (264) to store its value in an area X1 (266). Further monitoring the output 80 of the comparator 72, the controller 60 upon another reversal of the output 80 (268) reads a head position of that instant as indicated by the output 66 of the mechanism 64 (270), then stores its value in an area X2 (272), and then interrupts the head transport (274).

The controller 60 produces a simple mean X of the values stored in the areas X1 and X2 (276) and shifts the head 26 to the position X (278) while monitoring the output 66 of the head position detection mechanism 64. As a result, the head 26 is accurately positioned over the particular track N which has been designated via the keypad 84.

As described above, in the example shown in FIGS. 5A–5E, a mean of two spaced positions where an envelope crosses a threshold value Vth is calculated for a desired track only, thereby positioning the head 26 over the desired track. In an alternative procedure which will be described referring to FIGS. 6A–6F, the same calculation is effected for all the tracks after initialization to store the resulting track positions, so that the head 26 may be transported to any of the stored track positions when it is designated. In FIGS. 6A–6F, the same steps as those shown in FIGS. 5A–5E are designated by like reference numerals and detailed description thereof will be omitted.

Figure 5A:
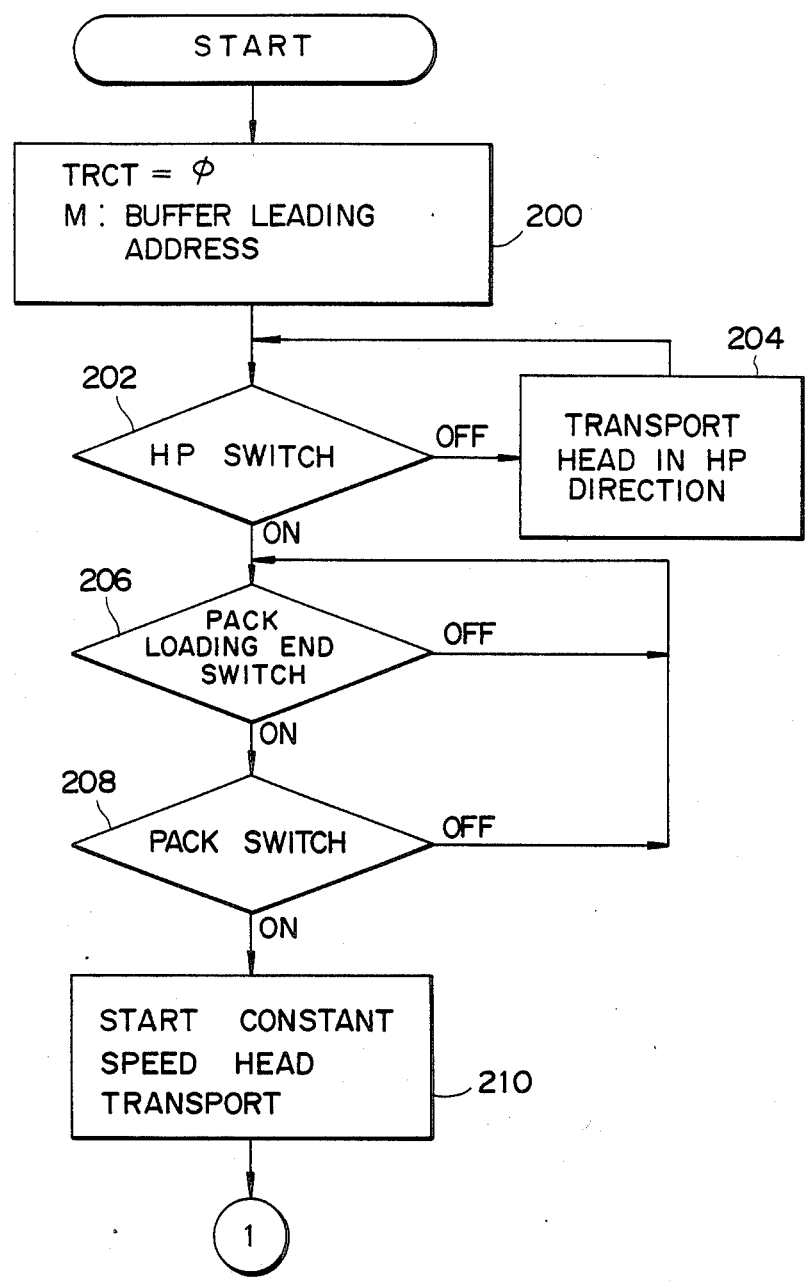
Figure 5B:
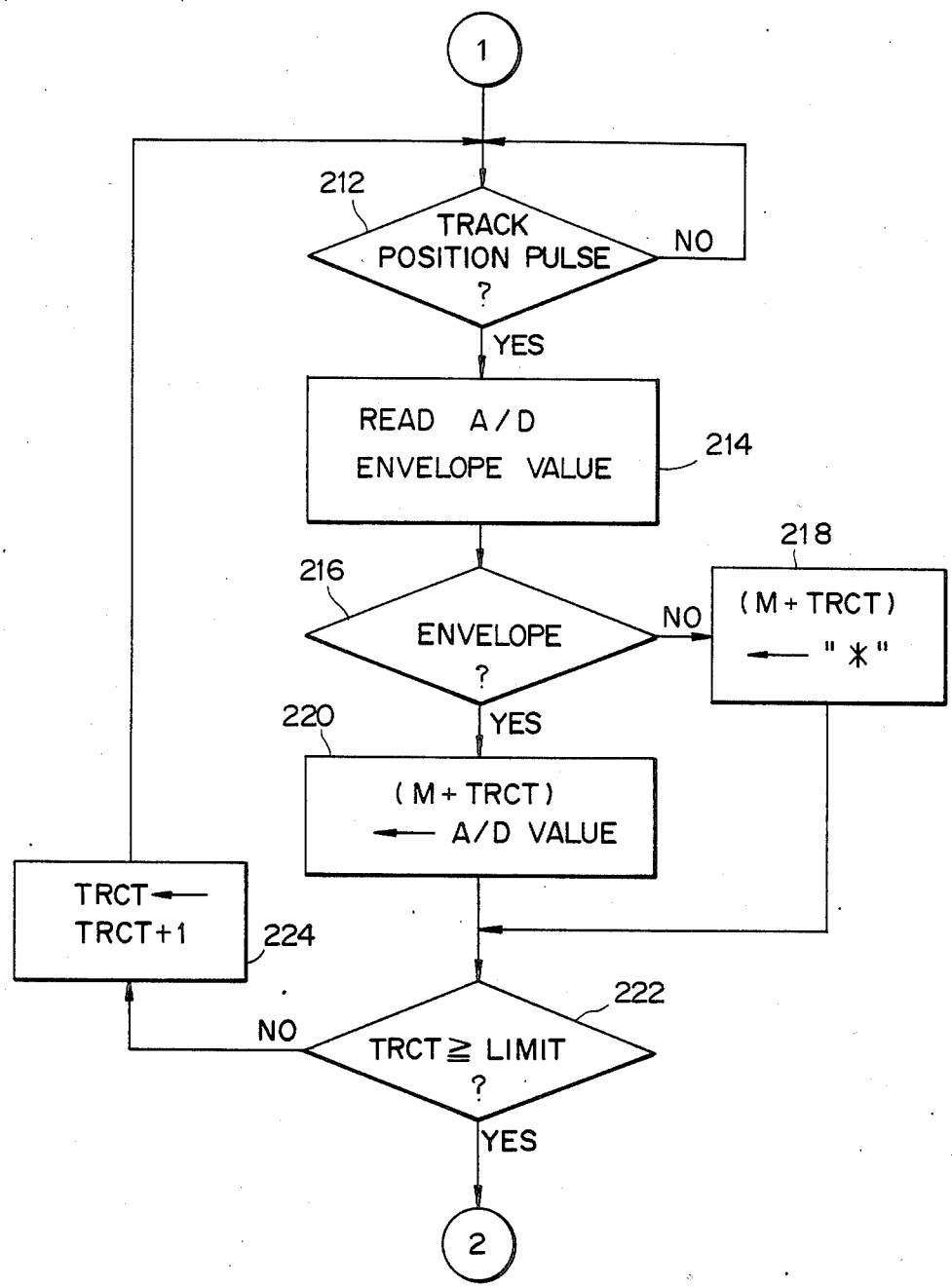
Figure 5C:
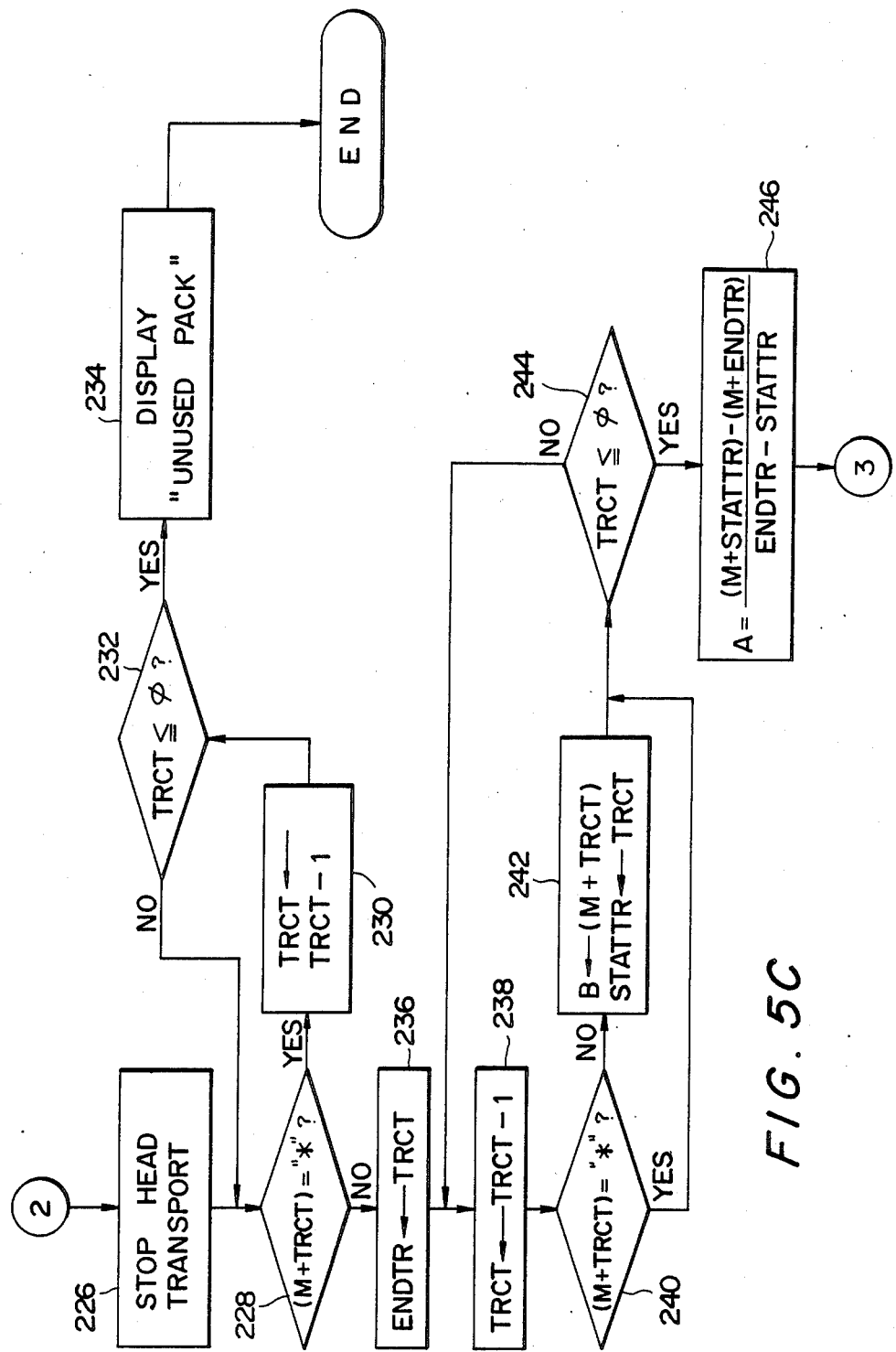
Figure 5D:
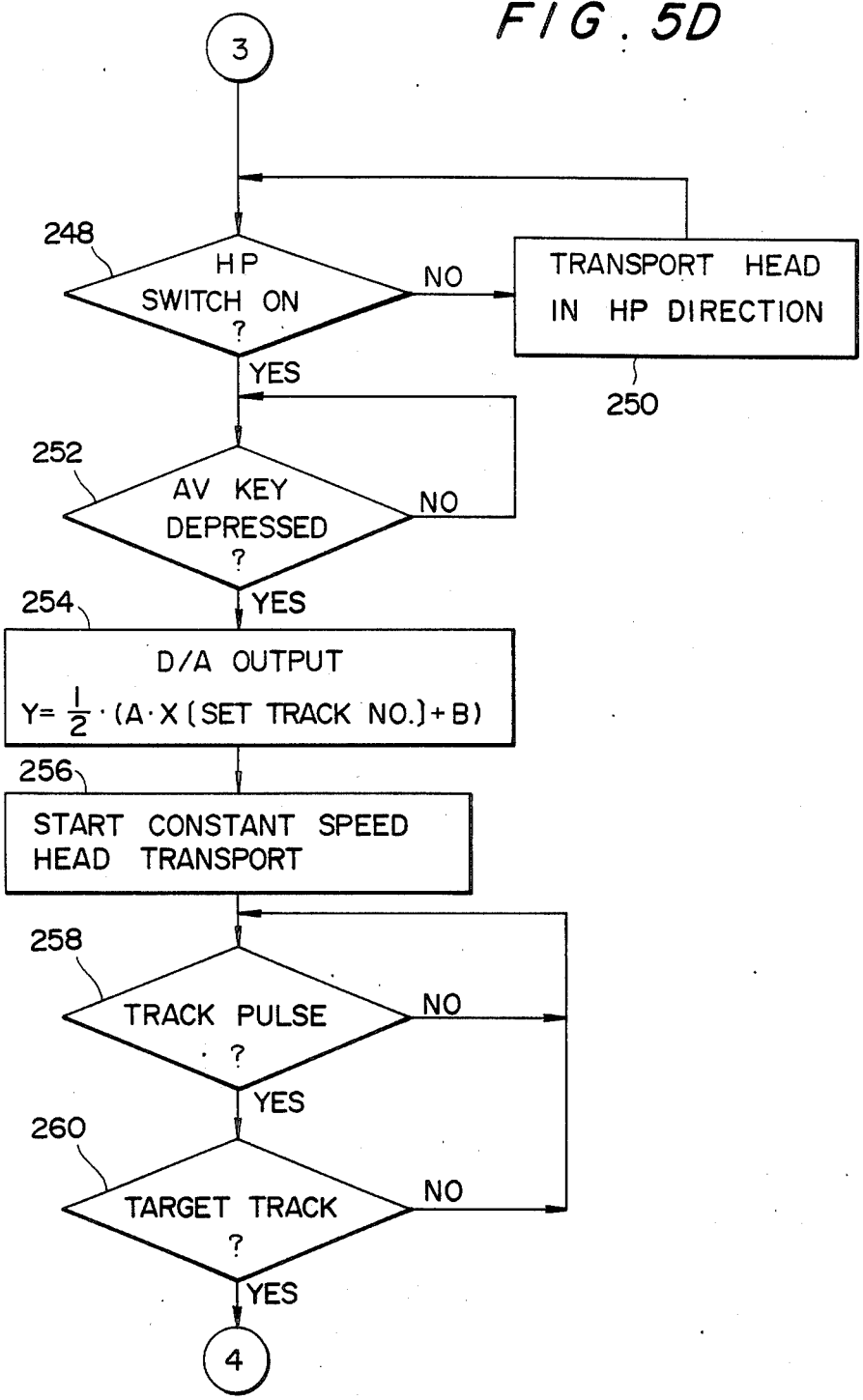
Figure 5E:
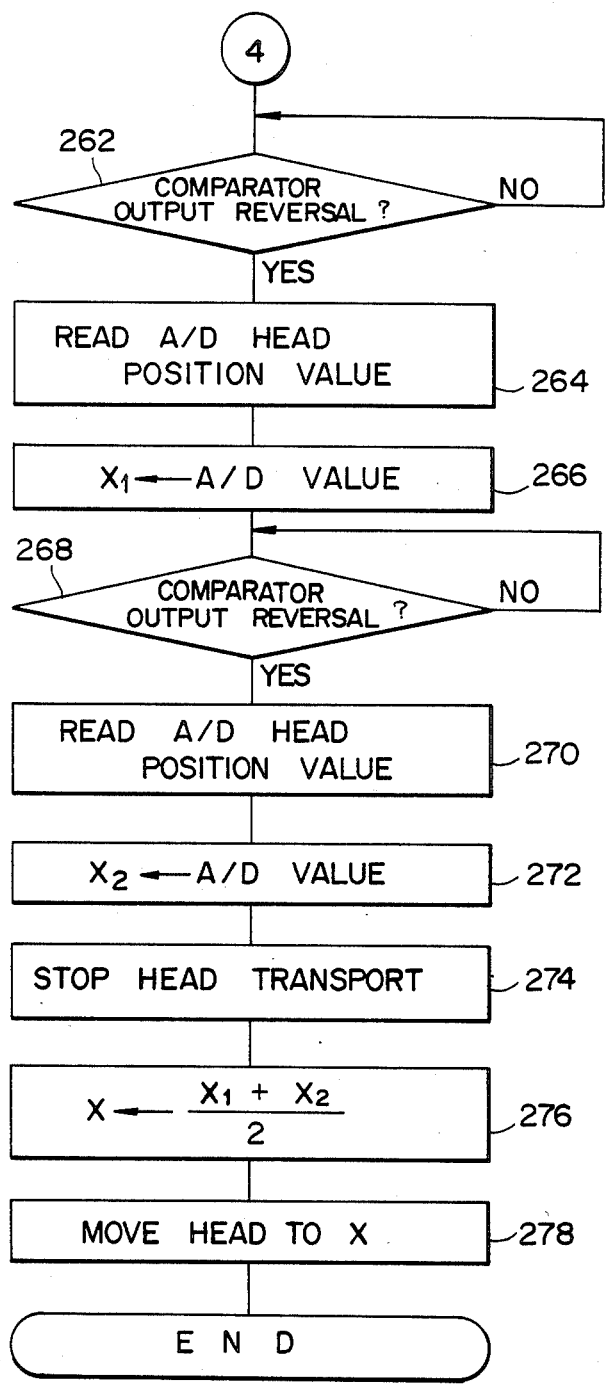
Figure 6A:
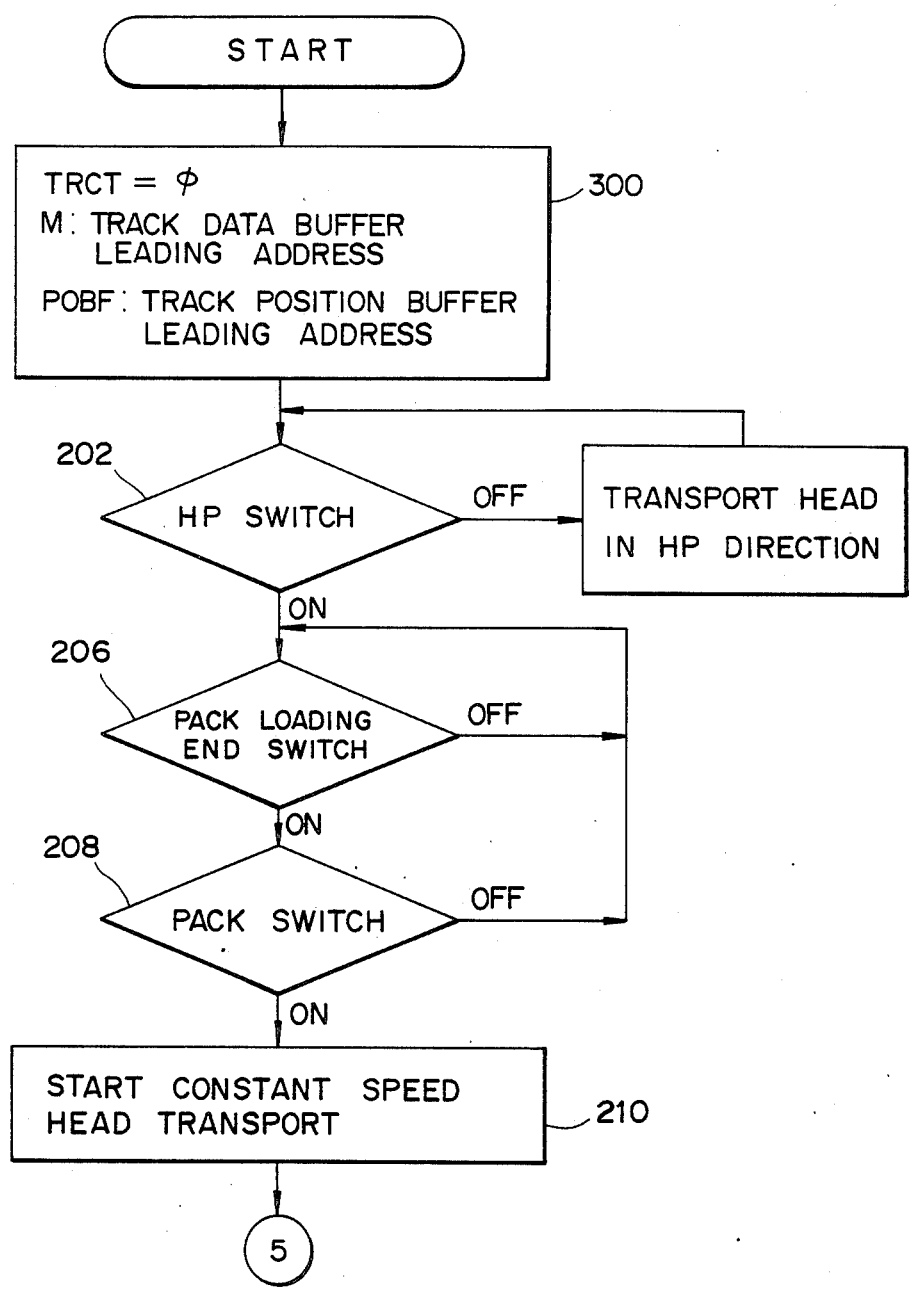
Figure 6B:
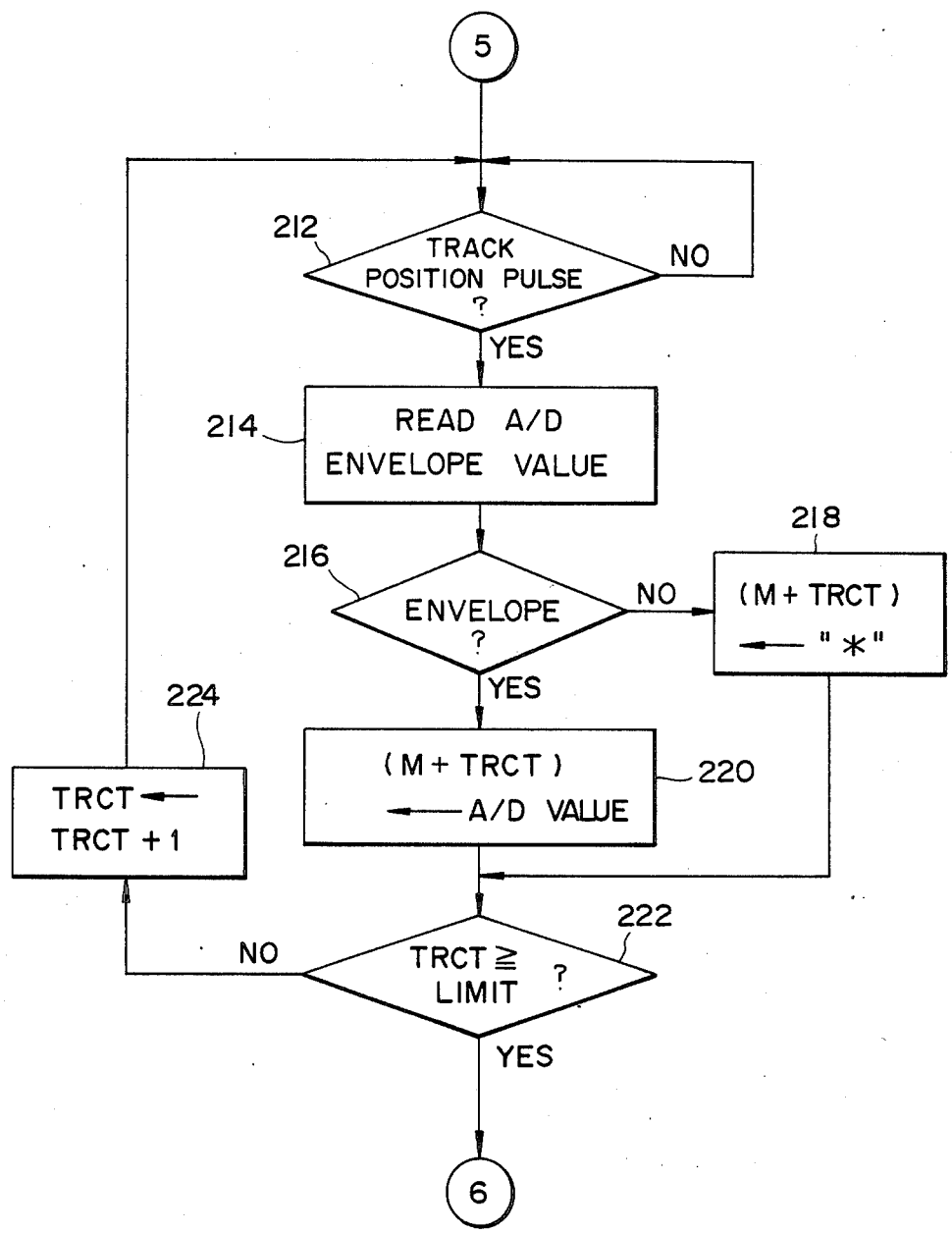
Figure 6D:
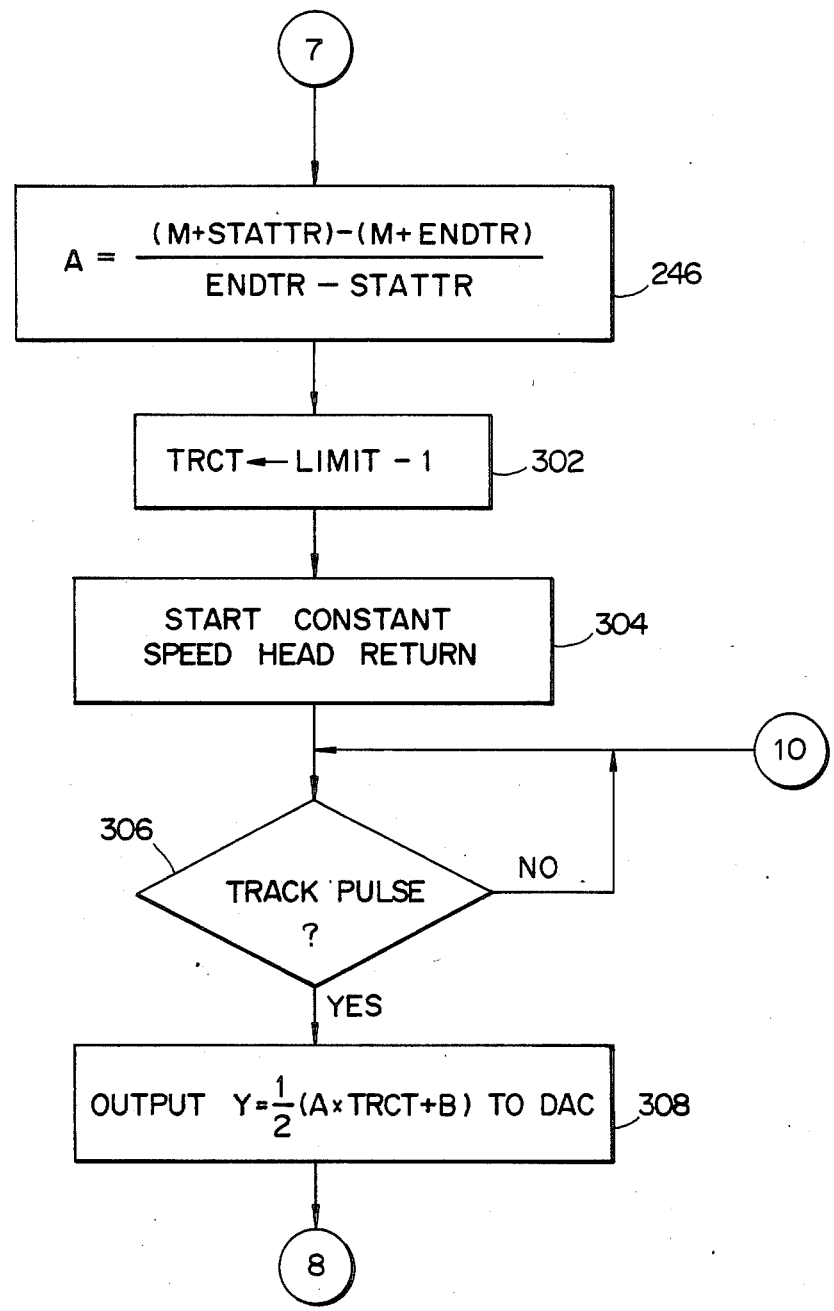
Figure 6E:
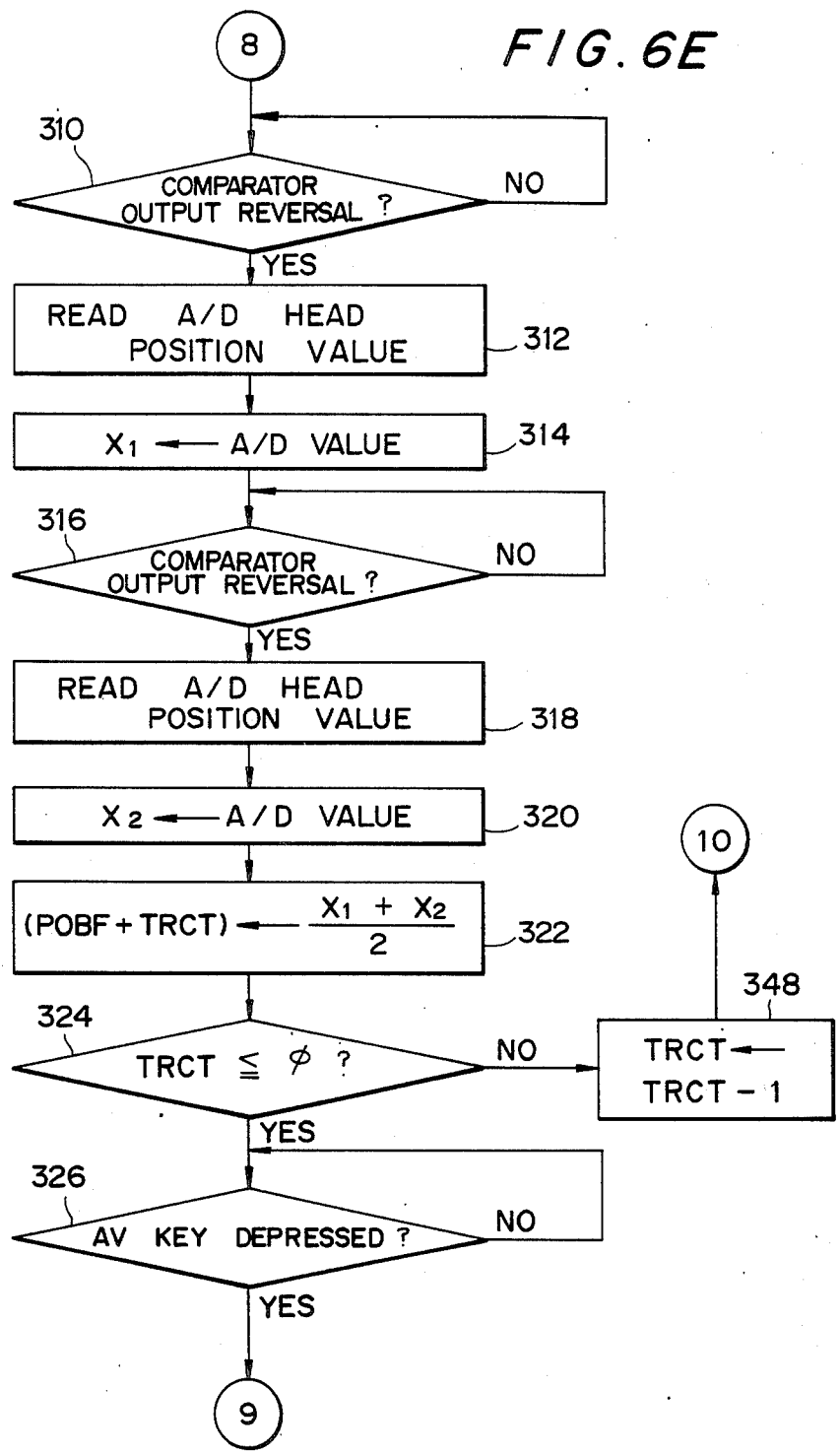
Figure 6F:
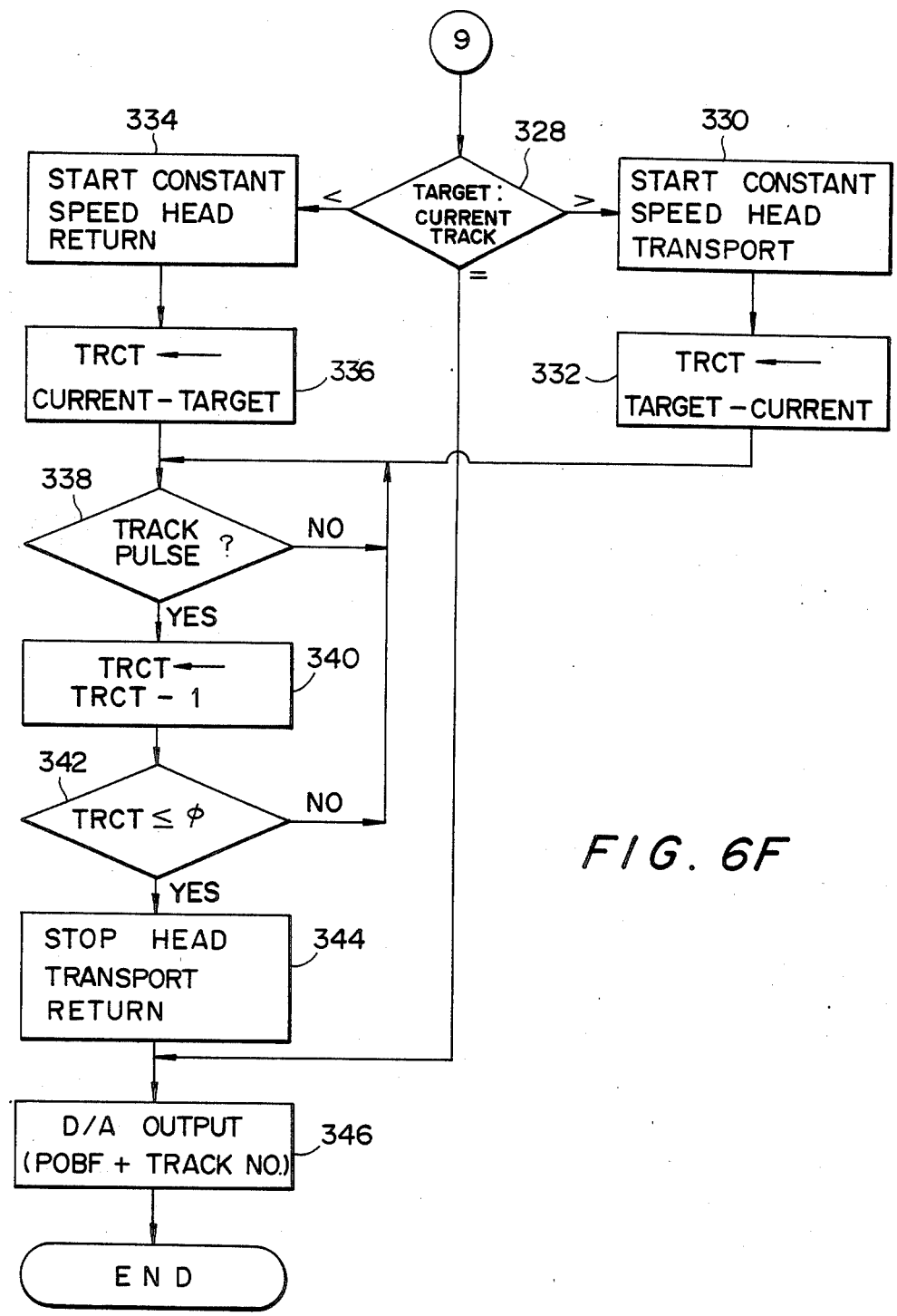

Referring to FIGS. 6A–6F, at an initializing step 300, the leading address POBF of track position buffer areas for storing track position data are set up in addition to the manipulation which is effected at the initializing step 200 of FIG. 5A. Naturally, such areas are set up in the store 92. This is followed by steps 202 to 246 which are identical with those of the previously described example.

After calculating a gradient A at the step 246, the controller 60 decrements the track counter TRCT (302) to transport the head 26 in reverse (304). As the controller 60 receives a track pulse 102 associated with the final track on the disk 10 from the output 66 of the head position detection mechanism 64 (306), the controller 60 computes data Y representative of a threshold value Vth by substituting a content of the track counter TRCT for N of the Eq. (1). The data Y is applied to the non-inverting input 76 of the comparator 72 (308).

Then, the controller 60 monitors the output 80 of the comparator 72 to detect a time when it is reversed (310). Upon the reversal, the controller 60 sees a position of the head 26 of that instant based on the output 66 of the head position detection mechanism 64 (312) and stores its value in the area X1 (314). Upon the subsequent reversal of the output 80 (316), the controller 60 sees a position of the head 26 of that instant responsive to the output 66 of the mechanism 64 (318) and stores its value in the area X2 (320). Thereafter, the controller 60 calculates a simple means X of the values stored in the areas X1 and X2 and stores it in a particular address of the track position data buffer which is designated by POBF+TRCT (322).

The above sequence of steps is repeated with the head 26 sequentially transported backwardly and with the counter TRCT sequentially decremented (348), until the counter TRCT reaches "0" (324). As a result, a mean of two head positions where an envelope crosses a threshold value is produced for each of all the tracks, the means values being sequentially stored in the track position buffer. After the counter TRCT has been decremented to "0", the controller 60 awaits depression of the track select key AV (326).

When the key AV is depressed (326), the controller 60 causes the head 26 to be driven either forward or backward toward a track whose number N has been selected via the keypad 84 (328–336). In this instance, the counter TRCT is loaded with a difference between the current track number and the desired or target track number (336, 332) and decremented responsive to every track pulse 102 (338, 340). As the head 26 arrives at a position adjacent to the target track, the counter TRCT becomes "0" (342) so that the head transport is temporarily stopped (344).

In the above condition, the controller 60 reads a content of the track position buffer which is associated with the target track, i.e., data stored in the track position buffer which is designated by (POBF)+N. The controller 60 controls the driver 50 such that the output 66 of the head position detection mechanism 64 becomes equal to the data read out of the buffer, thereby transporting the head 26 to the associated position (346). As a result, the head 26 is accurately brought into alignment with the target track N which has been specified via the keypad 84. In short, in this particular example, track positions are determined and stored for all the tracks and then, when any one of the tracks is designated, the head 26 is transported to the stored position.

In summary, it will be seen that the present invention provides a tracking apparatus which causes a magnetic head to track a rotary recording medium without resorting to the so-called envelope peak detecting autotracking control, that is, by determining two head positions for each track where the envelope crosses a threshold level, then calculating a mean or intermediate position between the two head positions, and then locating the head at the intermediate position. The threshold level is controlled to sequentially decrease with the decrease in the radius of a rack. Hence, accurate and rapid tracking control is achievable with no regard to the head position and, especially, random access to a desired track is accomplished effectively.

Various modifications will become possible for those skilled in the art after receiving the teachings of the present disclosure without departing from the scope thereof.

What is claimed is:

1. A tracking apparatus for tracking a track recorded in a rotary recording medium which rotates at a predetermined constant speed, having a playback head for sensing a signal out of a desired one of a plurality of tracks each being provided in the recording medium such that a beginning and an end of recording coincide with each other, head transport means for supporting said playback head movably along the recording medium, envelope detector means for detecting an envelope of the signal which is sensed by said playback head, and control means for controlling said head transport means to move said playback head to a position where a desired one of the tracks is located, wherein:
said head transport means comprises head position detector means for detecting a position of said playback head on the recording medium;
said control means controlling said head transport means to move said playback head to compute for one of the tracks two different positions at each of which a level of the envelope detected by said envelope detector means has a value substantially equal to a reference value, then computing an intermediate position between the two positions, and then controlling said head transport means to move said playback head to the intermediate position.

2. An apparatus in accordance with claim 1, wherein said control means comprises designation means for designating a desired one of the tracks,
said control means being further responsive to a desired one of the tracks designated by said designation means, for controlling said head transport means to move said playback head toward the designated track, then compute the two positions and, thereby, the intermediate position therebetween while said playback head is moved across the designated track, and then control said head transport means to transport said playback head to the intermediate position.

3. An apparatus in accordance with claim 1, wherein said control means comprises:
designation means for designating a desired one of the tracks; and
store means for storing data representative of a position of said head detected by said head position detector means;
said control means controlling said head transport means to transport said playback head, then compute for each of the tracks and from the position detected by said head position detector means two different positions where a level of the envelope detected by said envelope detector means has substantially the reference value while said playback head is moved across the track, then compute an intermediate position between the two positions computed for each of the tracks to store data representative of the intermediate positions in said store means, and then when a desired one of the tracks is designated by said designation means, controlling said head transport means to move said head to the stored intermediate position which is associated with the designated track.

4. An apparatus in accordance with claim 1, wherein the recording medium comprises a magnetic disk, said playback head sensing magnetically a signal out of a track recorded in the disk.

5. An apparatus in accordance with claim 1, wherein said control means further making the reference value variable in responce to a position of said head detected by said head position detector means, and controlling the reference value higher when the position of said head is associated with any of the tracks having comparatively large radii than when the position of said head is associated with any of the tracks having comparatively small radii.

6. An apparatus in accordance with claim 5, wherein said control means comprises comparator means for comparing an envelope detected by said envelope detector means with the reference value.

7. An apparatus in accordance with claim 5, wherein said control means comprises designation means for designating a desired one of the tracks,
said control means being further responsive to a desired one of the, tracks has being designated by said designation means, for controlling said head transport means to transport said playback head toward the designated track, then compute the two positions and, thereby, the intermediate position therebetween while said playback head is moved across the designated track, and then control said head transport means to transport said playback head to the intermediate position.

8. An apparatus in accordance with claim 5, wherein said control means comprises:
designation means for designating a desired one of the tracks; and
store means for storing data representative of positions of said head detected by said head position detector means;
said control means further controlling said head transport means to move said playback head, then compute for each of the tracks and with a position detected by said head position detector means the two positions where a level of the envelope detected by said envelope detector means has substantially the reference value while said playback head is moved across the track, then compute an intermediate position between the two positions computed for each of the tracks to store data representative of the intermediate positions, and then when a desired one of the tracks is designated by said designation means, control said head transport means to transport said playback head to the intermediate position represented by the stored data which is associated with the designated track.

9. An apparatus in accordance with claim 5, wherein the recording medium comprises a magnetic disk, said playback head sensing magnetically a signal out of a track recorded in the disk.

* * * * *